United States Patent [19]

Teradaira

[11] Patent Number: 5,412,761
[45] Date of Patent: May 2, 1995

[54] ARCHITECTURE AND METHOD FOR SUPPORTING ENABLE/DISABLE OF PRINTER PANEL SWITCHING BY A HOST COMPUTER

[75] Inventor: Mitsuaki Teradaira, Suwa, Japan

[73] Assignee: Seiko Epson Corporation, Tokyo, Japan

[21] Appl. No.: 259,929

[22] Filed: Jun. 15, 1994

Related U.S. Application Data

[63] Continuation of Ser. No. 91,523, Jul. 14, 1993, which is a continuation of Ser. No. 837,842, Feb. 18, 1992, abandoned.

[30] Foreign Application Priority Data

Feb. 18, 1991 [JP] Japan .................................. 3-023618
May 24, 1991 [JP] Japan .................................. 3-120399

[51] Int. Cl.$^6$ ............................................. G06F 15/00
[52] U.S. Cl. ...................................... 395/111; 395/112
[58] Field of Search ............... 395/112, 101, 111, 113, 395/114; 346/134, 154; 358/437; 341/22, 24; 355/313, 314; 400/61, 62, 70, 72, 50, 472, 480, 582

[56] References Cited

U.S. PATENT DOCUMENTS 4,994,988 2/1991 Yokoi .................................. 395/112

FOREIGN PATENT DOCUMENTS 5372 1/1985 Japan .
52728 3/1986 Japan .
183628 11/1988 Japan .

OTHER PUBLICATIONS

NX-1000 Multi-Font Printer Jan. 1987.

Primary Examiner—Arthur G. Evans
Attorney, Agent, or Firm—Eric B. Janofsky

[57] ABSTRACT

A printer is capable of controlling the enabled and disabled condition of front panel switches in a printer that operates based on control instructions sent from a host computer. A control instruction receiver in communication with the host computer passes received data to an instruction analyzer. An instruction execution means, coupled to the instruction analyzer directs the operation of a panel switch controller. The panel switch controller enables or disables the front panel switches according to control instructions sent by the host computer. In this way, interference with printer activity by switch operation can be prevented.

20 Claims, 4 Drawing Sheets

ARCHITECTURE AND METHOD FOR SUPPORTING ENABLE/DISABLE OF PRINTER PANEL SWITCHING BY A HOST COMPUTER

This is a continuation of application Ser. No. 08/091,523 filed Jul. 14, 1993, which is a continuation of application Ser. No. 07/837,842 filed Feb. 18, 1992, now abandoned.

BACKGROUND OF THE INVENTION

1. Field of the Invention

This invention relates generally to printer control architectures and methods, and more particularly to a printer control architecture and method for supporting the enablement/disablement of printer panel switches by a host computer.

2. Description of the Prior Art

Many printers are capable of receiving inputs from two sources. One source of inputs is a host computer which supplies control information to the printer as well as data for printing. A host computer of this type may be physically close to the printer (local) or a significant distance away (remote). A second source of inputs is from switches which are generally mechanical in nature, and which are further generally located on a front panel of the printer. These switches are referred to as front panel switches, or simply, panel switches.

The switches provide control information to the printer. Such control information is typically used to control the on-line/off-line state of the printer, form feeds, line feeds and the like. These switches are typically wired into printer control circuitry in such a manner that they are always active, that is enabled.

Prior art printers having switches that select the on-line/off-line state and that command paper feed do not have a panel switch controller or the control instructions that would control such a panel switch controller. Since the panel switches are continuously operable in prior art printers, it is possible to switch from on-line to off-line, or vice versa by operating the on-line switch. Similarly, it is possible to cause a line feed or form feed operation by means of the paper feed switch once the printer has inadvertently entered the off-line state.

It can be seen how prior art printers can suffer from operation of the panel switches which are continually enabled even though problems may occur with processing in the host computer or with the form setting for printing if the on-line switch is operated and the printer is switched on-line or off-line and paper feed performed by operating the paper feed :switch while the host computer is controlling the printer.

Therefore a need exists for a printer architecture and method for providing a printer that facilitates control of enabling or disabling operation of the panel switches by a host computer.

SUMMARY OF THE INVENTION

Accordingly, it is an object of the present invention to provide a printer that can prevent interference caused by accidental switch operation during printing.

It is a further object of the present invention to provide a printer that facilitates the ability of a remote host computer to enable or disable printer switches by means of control information transmitted to the printer.

The invention is a printer comprising an instruction receiver that receives instructions sent from the host computer, an instruction analyzer that analyzes the instructions, and a panel switch controller that is made up of an instruction execution means which executes the instructions and enables or disables operation of the first and second panel switches. The front panel switch controller acts, according to control information received from the host computer, to either engage and disengage, the front panel switches from the internal printer control pathways.

By means of the architecture, or configuration, of the present invention, operation of the front panel switches can be enabled or disabled by a host computer that, sends control instructions to the printer.

Other objects, advantages and attainments together with a fuller understanding of the invention will become apparent and appreciated by referring to the following description and claims taken in conjunction with the accompanying drawings.

DETAILED DESCRIPTION OF THE INVENTION

Figure 1:
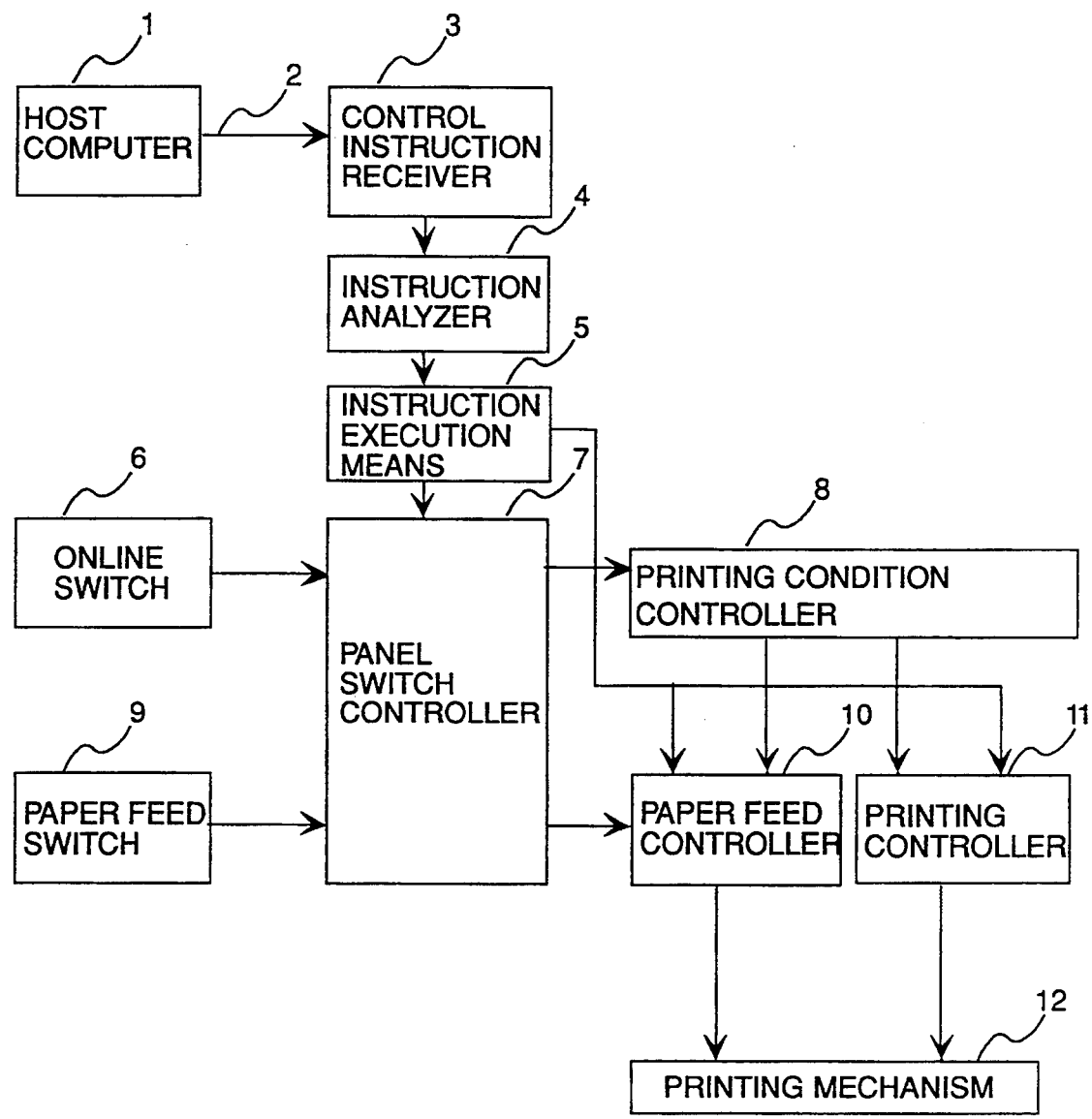
FIG. 1 is a block diagram showing the configuration of the printer of the invention.

Referring to FIG. 1, a host computer 1 is shown that sends control instructions via a transmission circuit 2 to a printer according to the present invention. A control instruction receiver 3 for receiving control instructions from host computer 1 is coupled to transmission circuit 2. An instruction analyzer 4 is coupled to control instruction receiver 3, and analyzes control instructions received therefrom. An instruction execution means 5, coupled to instruction analyzer 4 executes control instructions analyzed by instruction analyzer 4. A printing condition controller 8 performs control of switching the printer from on-line to off-line and off-line to on-line. A paper feed controller 10 is controlled by signals from instruction execution means 5 and printing condition controller 8. A printing controller 11 is controlled by signals from instruction execution means 5 and printing condition controller 8 so as to perform printing. An on-line switch 6 performs the switching operation from on-line to off-line or off-line to on-line by sending a signal to printing condition controller 8. A paper feed switch 9 performs paper feed by sending a signal to paper feed controller 10. A panel switch controller 7 is controlled by instruction execution means 5 and enables or disables operation of on-line switch 6 and paper feed switch 9. A printing mechanism 12 has printing and paper feed functions and is controlled by printing controller 11 and paper feed controller 10.

Figure 2:
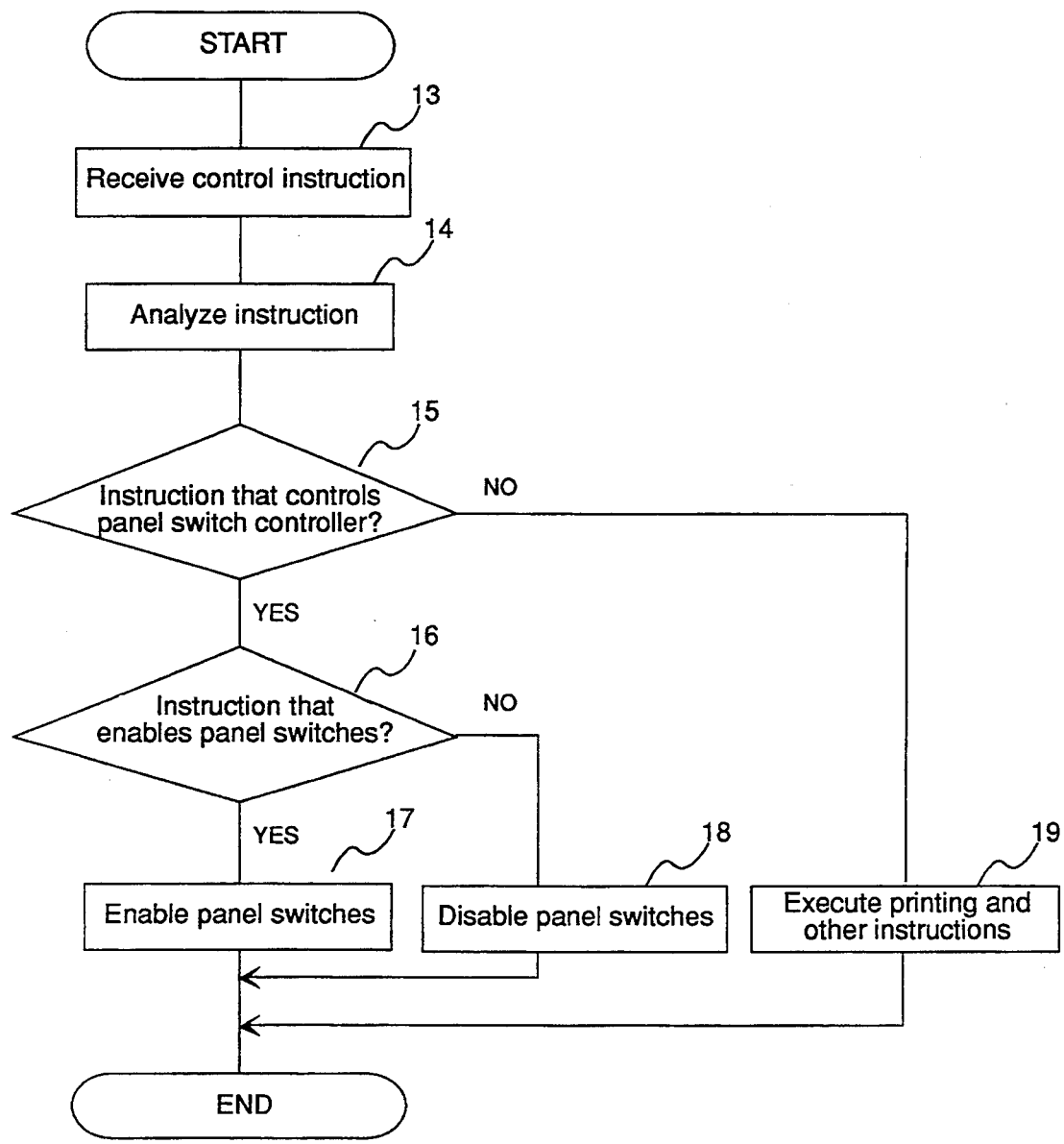
FIG. 2 is a flowchart of the processing performed by the printer of the invention when a control instruction affecting the enabled/disabled condition of the panel switches is received.

FIG. 2 shows the processing that is performed by the present invention when a control instruction that affects the on-line switch controller is received.

When a control instruction is received by control instruction receiver 3 (step 13), the instruction is analyzed by instruction analyzer 4 (step 14). If the analyzed instruction is one that controls panel switch controller 7

(step 1.5) and if it is an instruction that enables operation of the panel switches (step 16), then instruction execution means 5 causes panel switch controller 7 to enable subsequent operation of panel switches 6, 9. This enables switching of printing condition controller 8 from on-line to off-line or off-line to on-line by on-line switch 6 (step 17). This further enables control of paper feed controller 10 by paper feed switch 9 (step 17). If the analyzed instruction is one that disables operation of panel switches 6, 9 (step 16), then instruction execution means 5 causes panel switch controller 7 to disable subsequent panel switch operation, which disables control of printing condition controller 8 by on-line switch 6 and control of paper feed controller 10 by paper feed switch 9 (step 18). If the received control instruction is not one that controls the panel switch controller (step 15), then printing or some other command specified by the control instruction is executed (step 19).

As is readily understood by those of ordinary skill in this field, the control instruction receiver 3, instruction analyzer 4, execution means 5 and panel switch controller 7 can be implemented with digital logic circuits. These circuits may take the form of gate arrays, standard cells, or a fully customized, controller integrated circuit chip. These functional blocks may also be implemented with a microcomputer chip such as a commonly available 8051, or an also commonly available MC68HC11 microcomputer manufactured by Motorola. The best choice is typically the one which provides the required performance at the lowest cost. Market prices for the required components vary quite rapidly and so the most practical implementation choice will vary according to component pricing at the time a printer according to the present invention is produced.

Control instruction receiver 3 in an embodiment of the present invention is an interface such as RS-232C serial interface. In another embodiment control instruction receiver 3 is a Centronics standardized parallel interface. In this way the printer can be interfaced (i.e. connected for communication purposes) to a personal computer such as an IBM-PC. Typically the host computer is connected to control instruction receiver 3 by means of a cable.

Further, control instruction receiver 3 may be a radio receiver that provides an output suitable for the instruction analyzer. In this case the receiver would be similar to well-known pocket-pagers that output the telephone number of the calling party. Control instruction receiver 3 may be a Universal Asynchronous Receiver/Transmitter (UART), Universal Synchronous/Asynchronous Receiver/Transmitter (USART), a modulator-demodulator (modem) or a coder-decoder (codec). A UART may be integrated onto a microcomputer chip thus providing a single-chip implementation of the architecture of the present invention. Control instruction receiver 3 may be a local area network interface which conforms to one or more of the many local area network standards such as ARCNET, Ethernet, Token Ring or the like. The choice, as is readily apparent to those of skill in the art, depends on whether communication between the host computer and the printer takes place over local wires, via a telephone network, or by wireless means such as radio or infrared communication. The output of control instruction receiver 3 may be a serial bit stream or a parallel data output typically eight bits wide.

Figure 3:
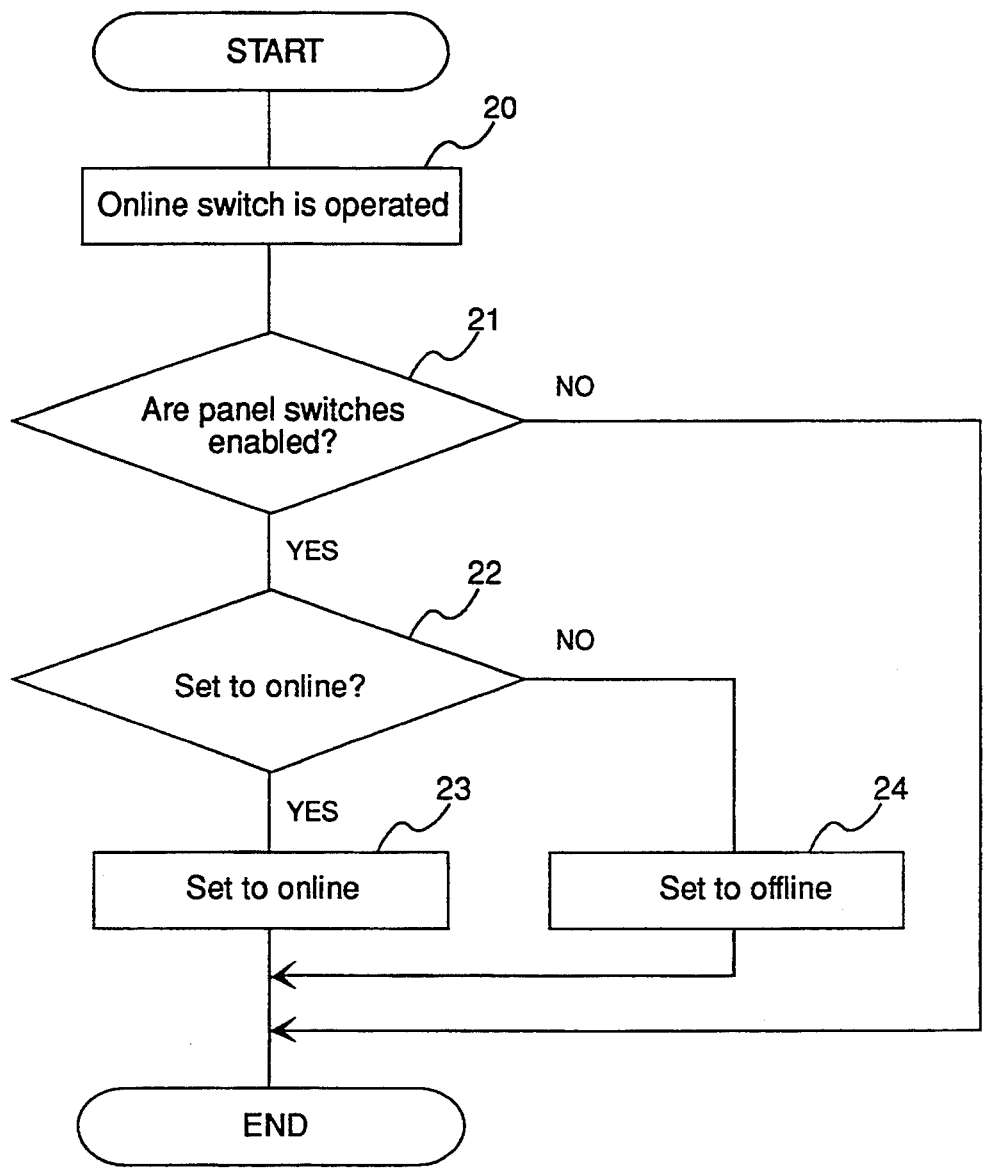
FIG. 3 is a flowchart of the processing performed by the printer of the invention when the on-line switch is operated.

FIG. 3 shows the processing performed when on-line switch 6 of the printer is operated.

When on-line switch 6 is operated (step 20) and enabled (step 21), then signals from on-line switch 6 are sent to printing condition controller 8 and switching of printing condition controller 8 from on-line to off-line (steps 22 and 24) or off-line to on-line (steps 22 and 23) is performed. If operation of on-line switch 6 has been disabled (step 21), then signals from on-line switch 6 are not sent to printing condition controller 8 and operation of on-line switch 6 is ignored.

Figure 4:
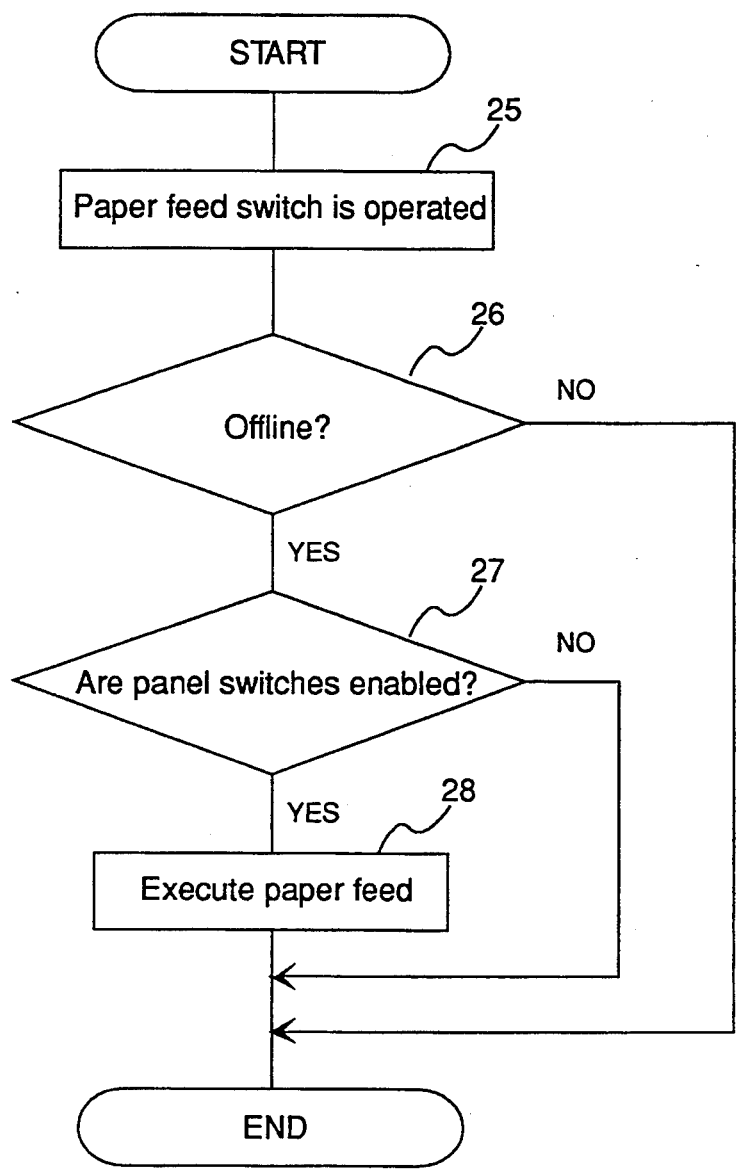
FIG. 4 is a flowchart of the processing performed by the printer of the invention when a paper feed switch is operated.

FIG. 4 shows the processing performed when paper feed switch 9 of the printer is operated.

When paper feed switch 9 has been operated (step 25) and if the printer is off-line (step 26) and panel switch controller 7 has enabled operation of the panel switches by an instruction that controls panel switch controller 7 (step 27), then the signal from paper feed switch 9 is sent to paper feed controller 10 and paper feed is executed (step 28). If operation of the panel switches has been disabled (step 27) and they are on-line (step 26), then the signal from paper feed switch 9 is not sent to paper feed controller 10 and operation of paper feed switch 9 is ignored.

By setting operation of the panel switches to a continually disabled condition, the printer can be used as a remote printer.

The present invention can also be applied to the operation of a paper feed switch in printers having a paper feed switch and no on-line switch. The present invention can further be applied to operation of a switch for releasing a paper holder when printing cut sheet forms in Point-of-Sale (POS) printers. Similarly, the architecture of the present invention provides for enabling and disabling both operation and signal detection in response to various types of detected signals. For example, error signals indicating no paper or an open cover may be used to direct the operation of the panel switch controller.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the subjoined claims.

What is claimed is:

1. A printer controller architecture, supporting a plurality of operating conditions, said operating conditions comprising on-line mode, off-line mode, and paper feed mode, said printer controller architecture having at least one panel switch for controlling said on-line mode operating condition, and a communication link with a host computer, said host computer providing a plurality of instructions comprising at least one of an enable instruction a disable instruction and a control instruction, comprising:

a) a control instruction receiver for receiving the plurality of instructions from said host computer;
b) an control instruction analyzer for analyzing the instructions received by said control instruction receiver;
c) instruction execution means for executing said control instructions in accordance with the instructions executed by said instruction execution means analyzed said control instruction analyzer; and
d) control means responsive to said instruction execution means said for one of enabling operability at least one panel switch; when the plurality of instructions comprises the enable instruction and disabling operability of said at least one panel switch when the plurality of instructions executed by said instruction execution means comprises the disable instruction.

2. The printer controller architecture of claim 1, wherein said control means is further coupled to at least one error detection circuit, and is further operable, in response to said error detection circuit to enable and disable said at least one panel switch.

3. The printer controller architecture of claim 1, wherein said instruction execution means comprises a microcomputer.

4. The printer controller architecture of claim 1, wherein said control instruction receiver comprises an RS-232C serial interface.

5. The printer controller architecture of claim 1, wherein said control instruction receiver comprises a Centronics standardized parallel interface.

6. The printer controller architecture of claim 1, wherein said control instruction receiver comprises a radio receiver.

7. The printer controller architecture of claim 1, wherein said control instruction receiver comprises a local area network interface.

8. The printer controller architecture of claim 1, wherein said control instruction receiver comprises a modem.

9. The printer controller architecture of claim 1, wherein said control instruction receiver comprises a codec.

10. The printer controller architecture of claim 1, wherein said control instruction receiver comprises an infrared receiver.

11. The printer controller architecture of claim 1, wherein said control instruction receiver, said control instruction analyzer, said instruction execution means, and said control means are all integrated on a single-chip.

12. The printer controller architecture of claim 1, wherein said at least one panel switch comprises one on-line/off-line switch and one paper feed switch.

13. The printer controller architecture of claim 2, wherein said error detection circuit detects an out-of-paper condition.

14. The printer controller architecture of claim 2, wherein said error detection circuit detects an open-cover condition.

15. A printer having an on-line condition, an off-line condition, and a housing, comprising:

a) a printing mechanism having a printing function and a paper feed function;
b) a means for controlling said paper feed function, coupled to said printing mechanism;
c) a means for controlling said printing function, coupled to said printing mechanism;
d) a printing condition controller operable to control the on-line/off-line condition of said printer, coupled to said means for controlling said paper feed function, and further coupled to said means for controlling said printing function;
e) a first switch operable to select the on-line/off-line condition of said printer, and a second switch operable to select the paper feed function of said printing mechanism, each of said first and second switches mounted on said housing;
f) a means for receiving a plurality of control instructions, coupled to a host computer;
g) a means for analyzing said control instructions, coupled to said means for receiving;
h) a means for executing said control instructions, coupled to said means for analyzing, further coupled to said means for controlling said paper feed function, and further coupled to said means for controlling said printing function; and
i) a switch controller, coupled between said first switch and said printing condition controller, further coupled between said second switch and said means for controlling said paper feed function, and further coupled to said means for executing said control instructions, said switch controller operable to enable and disable operation of said first and second panel switches in response to execution of control instructions by said means for executing said control instructions.

16. The printer of claim 15, wherein said means for executing said control instructions comprises a microcomputer.

17. The printer of claim 15, wherein said means for executing said control instructions comprises at least one gate array integrated circuit.

18. The printer of claim 15, wherein said means for receiving a plurality of control instructions includes a UART.

19. The printer of claim 15, wherein said means for receiving a plurality of control instructions comprises a radio receiver.

20. The printer of claim 15, wherein said means for receiving a plurality of control instructions comprises a UART integrated into a single-chip microcomputer.

* * * * *